Figure 1:
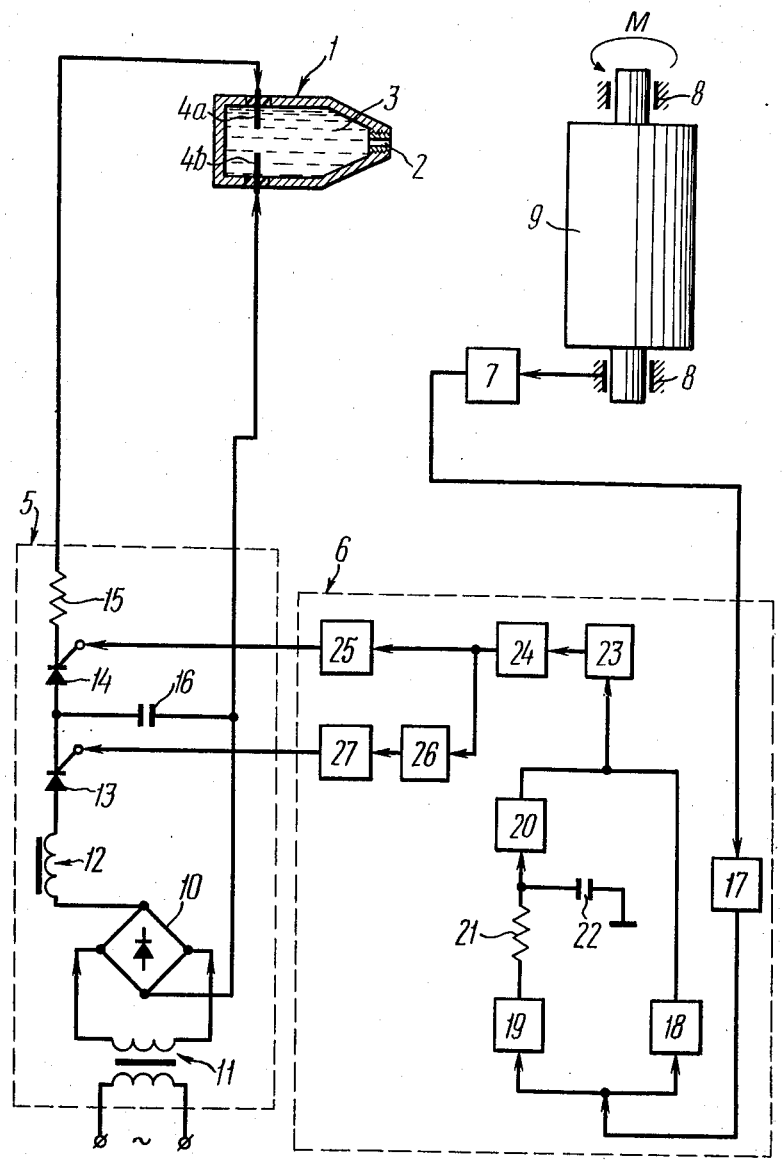

United States Patent [19]

Gusarov et al.

[11] 3,996,883
[45] Dec. 14, 1976

[54] DEVICE FOR BALANCING ROTORS

[76] Inventors: Anatoly Alexandrovich Gusarov, Universitetsky prospekt, 5, kv. 470; Lev Nikolaevich Shatalov, ulitsa Utrennyaya, 3, kv. 107, both of Moscow, U.S.S.R.

[22] Filed: May 28, 1974

[21] Appl. No.: 474,106

[52] U.S. Cl. .................... 118/8; 118/9; 118/320
[51] Int. Cl.² ................ B05C 11/10; B05C 5/00
[58] Field of Search ............ 118/8, 9, 411, 410, 118/320; 346/140; 101/1; 73/462

[56] References Cited
UNITED STATES PATENTS

| | | | |
|---|---|---|---|
| 2,071,967 | 2/1937 | Bungner | 346/140 X |
| 2,731,887 | 1/1956 | Sjostrand | 118/9 X |
| 2,937,613 | 5/1960 | Larsh | 118/9 X |
| 3,130,075 | 4/1964 | Larsh | 118/8 |
| 3,286,689 | 11/1966 | Ziemba | 118/411 |
| 3,408,220 | 10/1968 | Bendix et al. | 101/1 X |
| 3,640,214 | 2/1972 | Scheinhutte | 346/140 X |

FOREIGN PATENTS OR APPLICATIONS 1,010,543  11/1965  United Kingdom ............ 118/8

*Primary Examiner*—John P. McIntosh
*Attorney, Agent, or Firm*—Haseltine, Lake & Waters

[57] ABSTRACT

Device for the balancing of rotors, comprising a chamber for a liquid balancing compound, the chamber containing electrodes connected to a pulse generator which is connected electrically with the output of a control unit whose input is connected to a transmitter which registers vibration parameters of the rotor while the latter rotates in supports in front of a nozzle in the chamber. At a moments when the "light" point on the surface of the rotor passes in front of the nozzle, the transmitter sends signals to the control unit and, responding to these signals, the pulse generator sends corresponding electric pulses to the electrodes in the chamber; the resultant electrohydraulic impacts discharge portions of the balancing compound through the nozzle onto the "light" point of the rotor.

7 Claims, 3 Drawing Figures

DEVICE FOR BALANCING ROTORS

The present invention relates to a device for balancing machine elements, for example rotors.

The invention can be used both for the static and the dynamic balancing of rotors, most successfully in systems for the automatic balancing of rotors in the course of their operation, i.e. for balancing grinding stones in the machine-building industry, turbogenerator rotors in the power engineering industry and gyroscope rotors in the instrument-building industry.

Known in the prior art is a method of balancing rotors wherein the rotor is rotated in supports, the vibration parameters of these supports are measured and these measurements are used to find the point on the rotor surface to which a balancing weight must be attached. This point will be referred to hereinafter as the "light" point.

Then the balancing weight is fastened to this point on the surface of the rotor by successive application to it of portions or amounts of a quickly solidifying liquid compound. This process is repeated until the unbalance of the rotor is brought down to the permissible limit.

In one of the known balancing methods the balancing compound consists of a molten metal which is applied to the surface of the rotor by exploding metal wire with the aid of an electric discharge.

The device for the realization of this method comprises an electromagnet with a fixed core having a gap with two pairs of guide rollers and a pair of high-voltage contacts connected to a capacitor battery installed on both sides of said gap.

A length of thin metal wire is pulled between these rollers by a guide; when this wire touches both high-voltage contacts, this produces a short circuit, the wire explodes, melts and the molten metal is applied to the "light" point on the surface of the rotor mounted in supports in front of the device. The "light" point is found by measuring the vibration parameters of the rotor supports during the rotation of the rotor.

This known method of balancing rotors is adapted only for using a metallic balancing compound which restricts the field of application of the method.

It should also be taken into account that the explosion of the wire produces a metal cloud so that only a part of the total amount of molten metal is applied to the surface of the rotor being balanced; this also affects adversely the efficiency of the method.

A substantial disadvantage of the known balancing device lies in that, due to the necessity for pulling a thin metal wire between the guide rollers, the frequency of application of the portions or amounts of molten metal to the surface of the rotor is low, the portions themselves are small and cannot be controlled to suit the dimensions of the rotor and the degree of its unbalance; all this leads to a comparatively low efficiency of the device.

Besides, the conveyance of the thin wire from one set of contacts to the other and the possibility of the wire becoming welded to the contacts impair the reliability of the device.

Known from the prior art, covered by appropriate patents, is a device for balancing rotors wherein the portions of a liquid balancing compound are applied to rotors by a mechanical appliance (see, for example, U.S. Pat. No. 3130075).

This device comprises a chamber with a piston, the chamber being used as a reservoir for the liquid balancing compound, and a cylindrical bar with an axial bore, the inside of which communicates with the chamber and in which the rod of the piston moves. The piston is moved in the chamber by a mechanical appliance comprising a driving disc and cam discs, the last cam disc carrying a field coil and an impact mechanism.

The device also comprises a unit controlling the appliance and responding to the signals of the vibration transmitter which registers the vibrations of the supports on which the rotor is installed in the course of balancing.

As the rotor rotates in the supports, the signal of the support vibration transmitter (these vibrations being proportional to the unbalance of the rotor) enters the control unit and further, the field coil on the cam disc. As a result the cam disc is attracted to the driving disc and strikes the head of the piston which pushes the rod in the bore of the bar, the latter being filled periodically with portions or amounts of the balancing compound from the chamber. The rod discharges each amount of the balancing compound onto the surface of the rotor exactly at the moment when the "light" point of its surface passes before the axis of the bore in the bar.

The disadvantages of this device, like those of the first-mentioned one, include infrequent of discharges of the balancing compound because the appliance for discharging this compound comprises a number of mechanically linked parts, and the fact that the amounts of the discharged liquid balancing compound are constant and cannot be changed to suit the dimensions of the rotor and the degree of its unbalance.

A common disadvantage of the above-quoted devices for balancing rotors is also their comparatively complicated design incorporating a large number of movable parts and units which render these devices unreliable in service.

An object of the present invention resides in eliminating the aforesaid disadvantages.

The main object of the present invention is to provide a device for applying a novel method of balancing rotors, which makes it possible to change the mass of the portions or amounts of a quickly solidifying, liquid balancing compound to suit the weight of the rotor and the degree of its unbalance, to increase the frequency of the discharges, and which device improves the efficiency and accuracy of the rotor balancing process as a whole.

This object is accomplished in that the inventive device uses a method of balancing rotors which consists in finding a "light" point on their surface and applying the amounts of the balancing compound to this point, this being repeated until the unbalance of the rotor is brought down to a permissible limit. It is important that each portion of the balancing compound is applied by the force of a controllable electrohydraulic impact.

The invention more particularly provides a device for balancing rotors, comprising a chamber used as a reservoir for the balancing compound and provided with an appliance for the successive application of portions or amounts of the compound in a liquid state through a hole in the wall of the chamber onto the surface of a rotor rotated in supports in front of the chamber, and a unit controlling this appliance and connected electrically with a transmitter which transmits the vibration parameters of the rotor.

According to the invention, the appliance for the application of balancing-compound portions comprises electrodes installed in the chamber and forming a discharge gap, and a pulse generator to which the electrodes are connected, the pulse generator being connected to the output of the control unit and, responding to its signals, sends electric pulses to the electrodes, thus causing electrohydraulic impacts in the chamber.

The use of the energy of the controlled electrohydraulic impact, coupled with the application of small amounts of the liquid, quickly solidifying balancing compound to the surface of the rotor renders it possible to control the mass of the discharged amounts of this compound to suit the dimensions of the rotor, the degree of its unbalance, and to increase the frequency of application of the small amounts.

All these factors taken together provide for a high efficiency and accuracy of rotor balancing with the inventive device, all the more so because the rotors can be automatically balanced in the course of their operation.

Another noteworthy advantage lies in that the balancing compound can be selected from a large number of materials whose only requirements are the possibility of keeping them in a liquid state, their capacity of adhering to the surface of the rotor, and the speed of their solidification on the rotor surface. Such materials can be, for example, molten metals, plastics, resins and glues.

Comprising no movable parts, the balancing device according to the invention is highly dependable in operation, ensures repeated discharges of the balancing-compound amounts and, therefore, greatly increases the efficiency and accuracy of rotor balancing.

It is recommended by the invention that the pulse generator has two switching devices including thyristors, one of them being in the charging circuit of the generator and the other one in its discharge circuit. The control unit preferably has a threshold device in the form of a Schmitt trigger which sends signals to the thyristors of the pulse generator when the unbalance of the rotor exceeds the permissible level. Furthermore it is also recommended that the control unit is provided with a signal-delay circuit in the control circuit of a first thyristor, and having a time constant which exceeds the time of discharge of the generator discharge circuit.

Such an arrangement of the pulse generator and the control unit makes it possible to set the operation of the device on an automatic principle so that in case of an impermissibly high rotor unbalance the device operates continuously and stops only on completion of balancing. In this layout the current pulses are sent to the electrodes for producing electrohydraulic impacts in the chamber, and the portions of the balancing compound are discharged through a chamber nozzle at the moment when the "light" point on the surface of the rotor is in a preset position with regard to the nozzle axis, and the pulse generator starts to be charged only after the completion of the processes taking place in its discharge circuit.

It is likewise suggested that the control unit has series-connected second and third Schmitt triggers which are connected in parallel with the earlier-mentioned Schmitt trigger, that an integrating circuit be provided between the second and third Schmitt triggers, and that there is a circuit for comparing the signals received from the first and third triggers. This circuit is preferably also made in the form of a Schmitt trigger whose output is connected to a pulse counter including Schmitt triggers and connected to control circuits of the first and second thyristors.

Such a control unit improves the accuracy of balancing since it ensures the sending of a signal for opening the discharge circuit of the pulse generator and allows the small amounts of the balancing compound to be discharged at the same preset position of the "light" point on the surface of the rotor relative to the axis of the nozzle regardless of the amplitude of the transmitter signal.

The provision of the pulse counter in the control unit circuit makes it possible to discharge the balancing-compound amounts once in a number of rotor revolutions, which improves its balancing accuracy by canceling the effect produced on the transmitter signal by forced vibrations of the rotor caused by the impacts of the compound amounts applied to the rotor.

In one of the exemplary embodiments of the balancing device according to the invention the chamber comprises a movable partition dividing the same into two isolated spaces so that the electrodes and the nozzle are located in different spaces. The space with the electrodes is filled with a neutral liquid for the electrohydraulic impact (e.g. water) whereas the space with the nozzle contains the liquid balancing compound whose portions are discharged through the nozzle at the moments of the electrohydraulic impacts in the adjacent space of the chamber under the effect of the partition which transmits these impacts.

Such a chamber structure makes it possible to use such balancing compounds as liquid metals which are generally not suitable for producing an electrohydraulic effect due to their electric conductivity.

The movable partition can be made in the form of a flexible membrane, thus constituting a reliable means for transmitting the electrohydraulic impacts to the balancing compound since the membrane cannot get warped or jammed while moving in the chamber.

The movable partition can also be made in the form of a piston. This feature makes it possible to utilize the entire mass of the balancing compound contained in the chamber and to ensure an efficient heat insulation between the chamber spaces, if the liquids that fills them are to have different temperatures.

The piston can have two faces or steps that enter or protrude into the corresponding spaces of the chamber, in which case the smaller step is directed towards the chamber nozzle. Such a two-step piston enables balancing accuracy to be improved by reducing the mass of the portions of the discharged liquid balancing compound and increasing the initial velocity of the discharge because in this case the piston functions as a hydraulic booster which raises the pressure in the space with the liquid balancing compound above the pressure arising in the space with the liquid for the electrohydraulic impact; this reduces the volume of the discharged portion of the balancing compound and increases its initial velocity.

In all the above-mentioned inventive embodiments of the chamber the nozzle can be made replaceable. The replaceable nozzle makes it possible to control the efficiency and accuracy of the balancing by changing the area through the nozzle which changes the mass of the discharged portions of the liquid balancing compound, the energy of the electrohydraulic impacts remaining the same.

Besides, it becomes possible to use nozzles of various shapes and dimensions for the application of liquid balancing compounds having different properties, e.g. having different forces of surface tension.

Figure 2:
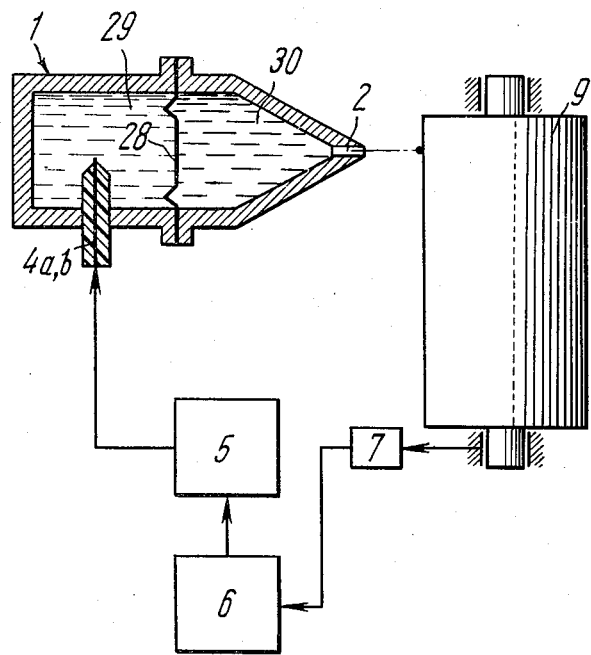
Figure 3:
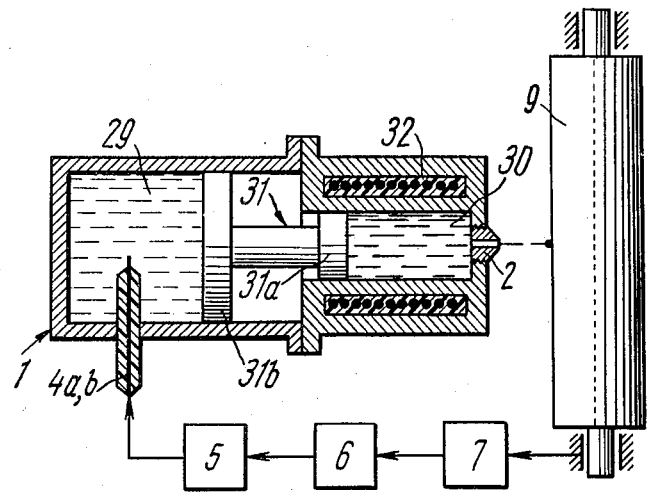

Now the invention will be described by way of example of an exemplary device for balancing rotors, with reference to the accompanying drawings, in which:

FIG. 1 shows an electric block diagram of a rotor balancing device according to the invention;

FIG. 2 — same, showing a longitudinal section of a second version of a chamber in the device; and FIG. 3 — same, showing a similar section of a third version of the chamber.

The method of balancing rotors practiced by the inventive device according to the invention consists in finding a "light" point on the surface of each rotor and successively applying to it portions or amounts of a liquid, quickly solidifying balancing compound. Such materials are, for example, molten metals, resins, glues, plastics, etc.

Each portion of the compound is applied under the effect of a controlled electrohydraulic impact. This process is repeated until the unbalance of the rotor is brought down to the permissible limit.

The position of the "light" point on the surface of the rotor is determined by the position of the "heavy" point, and the latter is found by measuring the vibration parameters of the rotor being balanced.

The exemplary device for balancing rotors, e.g. as shown at 9, comprises a closed cylindrical chamber 1 (FIG. 1) provided in a conventional housing, with a hole in one of its face surfaces, and a replaceable nozzle 2 screwed into said hole.

If the selected balancing compound can carry an electric discharge, the chamber 1 is filled with this compound 3 in a liquid state and an electric discharge produced in said compound; the discharge causes an electrohydraulic impact which discharges small amounts of the compound 3 through the nozzle 2.

For producing this impact, the chamber 1 contains two electrodes 4 a and 4b connected to a discharge circuit of a pulse generator 5 which generates high-voltage electric pulses as a response to a signal of a control unit 6 whose output is connected to the generator.

The input of this generator control unit 6 is connected to a vibration transmitter 7 which registers vibration of supports 8 in which the rotor 9 being balanced is mounted in front of the nozzle 2 of the chamber.

The pulse generator 5 comprises a rectifier 10 whose input is connected parallel with a voltage-boost winding of a mains-powered transformer 11 while the output of the rectifier is connected to two parallel circuits. One of these comprises one of the electrodes 4a installed in the chamber 1 while the second one comprises a series-connected inductance 12, two switching devices in the form of thyristors 13 and 14, a shaping resistor 15 and the second electrode 4b. Connected in parallel with these circuits is a capacitance storing device 16.

The transformer 11, rectifier 10, inductance 12, thyristor 13 and capacitance storing device 16 form a charging circuit of the pulse generator 5 whereas the same storing device 16, thyristor 14, resistor 15 and both electrodes 4a and 4b form its discharge circuit.

The control unit 6 of the pulse generator 5 comprises an amplifier 17 whose input is connected to the transmitter 7 and the output is connected to two parallel circuits the first of which is a threshold device in the form of a Schmitt trigger 18 and the second one consists of two series-connected Schmitt triggers 19 and 20 with a resistor 21 between these triggers and provided with a parallel-connected capacitor 22, all these forming an integrating circuit.

The outputs of the triggers 18 and 20 are connected to the input of a signal-comparison circuit 23 also made in the form of a Schmitt trigger whose output is connected to the input of a pulse counter 24, the latter also comprising Schmitt triggers.

The outputs of the counter 24 are connected to the control electrodes of the thyristors 14 and 13 of the pulse generator 5 through two parallel circuits the first of which comprises an amplifier 25 while the second one has a series-connected signal-delay circuit 26 made in the form of a single flip-flop oscillator and an amplifier 27.

In another version of the device for balancing the rotors 9 the chamber 1 accommodates a movable partition in the form of a membrane 28 (FIG. 2) membrane divides said chamber into two isolated spaces 29 and 30 so that the electrodes 4a and 4b are installed in the space 29 which is filled with a neutral liquid, e.g. water, producing electrohydraulic impact whereas the nozzle 2 is located in the space 30 filled with the balancing compound 3 in a liquid state.

During the electric discharge between the electrodes 4a and 4b in the space 29, the movable partition 28 takes up the pressure produced by the electrohydraulic impact and transmits it to the balancing compound contained in the adjacent space 30.

Such a division of the chamber 1 into two isolated spaces 29 and 30 makes it possible to use balancing compounds, e.g. metals, in which it is difficult to produce an electrohydraulic impact the to their electric conductivity.

The movable partition in the form of a flexible membrane 28 is simplest and most reliable in operation since its movement involves no danger of warping or jamming. However, such a membrane 28 precludes the possibility of using up the entire mass of the liquid balancing compound contained in the space 30 of the chamber 1 because of the limited movement of the membrane 28.

Besides, when the rotors are balanced with the aid of liquid substances at elevated temperatures, the membrane 28 fails to ensure sufficient heat insulation between the spaces 29 and 30.

In such cases the movable partition can be made in the form of a piston 31 (FIG. 3) capable of moving axially in the chamber 1, this movement being sufficient for utilizing the entire mass of the balancing compound contained in the space 30 of the chamber 1.

Such a piston 31 can be made from a material with a low coefficient of heat transfer or it can have heat-insulating inserts to ensure heat insulation between the spaces 29 and 30 of the chamber 1 if the liquids in these spaces must have different temperatures.

To attain a higher accuracy of rotor balancing by reducing the mass of each small portion or amount of the balancing compound and to increase the initial velocity of the discharged portions, one of the versions of the chamber 1 is provided with a two-step piston 31 (as shown in FIG. 3) installed so that a smaller step 31a therein enters the space 30 of the chamber 1 filled with the balancing compound. The larger step 31b is in space 30, connected with step 31a by an intermediate member.

Such a piston 31 functions as a hydraulic booster, raising the pressure in the corresponding space 30 above the pressure arising during the electrohydraulic impact in the adjacent space 29 and increasing the initial velocity of the discharged portion of the balancing compound with a simultaneous reduction of the mass of each portion. In this case the coefficient of pressure rise will be equal to the ratio of the areas of the larger 31b and the smaller 31a steps of the piston 31 with a corresponding reduction of the mass of the discharged portion of the balancing compound which eventually improves the accuracy of rotor balancing.

In order to control the efficiency and accuracy of balancing by changing the mass and initial velocity of the discharged portions or amounts of the balancing compound at a constant energy of the electrohydraulic impacts, the nozzle 2 of the chamber 1 is installed with a provision for its replacement. This renders it also possible to change the shape and size of the channel in the nozzle 2 to suit the properties of the balancing compound, e.g. forces of surface tension.

When the balancing compound is in a liquid state and at a high temperature, the chamber 1 may be enclosed in a housing accommodating an appliance in the form of an electric heater 32 for heating the chamber.

The device for balancing rotors functions as follows. When the pulse generator 5 is fed by an A.C. mains, with the thyristor 13 open, the capacitor 16 becomes charged through the transformer 11, rectifier 10, inductance 12 and thyristor 13.

When the charging current passes the zero point, the thyristor 13 closes and the capacitor 16, owing to the presence of the inductance 12 in the circuit, is charged to almost twice the previous voltage of the rectifier 10. Thus the generator 5 is readied for operation.

Then the rotor 9 is set in rotation in the supports 8 by drive means shown at M in FIG. 1. The transmitter 7 produces a sinusoidal signal whose amplitude depends on the vibration parameters of the supports 8 of the rotor 9, these parameters being proportional to its unbalance. The maximum and minimum levels of the signal from the transmitter 7 correspond to the positions of the "heavy" and "light" points on the surface of the rotor 9.

The signal of the transmitter 7 is delivered through the amplifier 17 to the trigger 18 which acts as a threshold device wherein the signal of the transmitter 7 is compared against a certain voltage which corresponds to the permissible unbalance of the rotor.

If the unbalance of the rotor 9 exceeds the permissible level, the trigger 18 receives a signal which is stronger than the operational threshold; the trigger opens and produces a rectangular signal.

At a voltage, which is equal to the opening voltage the trigger 18 will close. However, at various amplitudes of the signal produced by the transmitter 7, the operating time of the trigger 18 will differ somewhat which may affect the accuracy of balancing.

This disadvantage is countered by providing a second electric circuit which is parallel to the first one and contains the trigger 19, also receiving the signal from the transmitter 7. The trigger 19 in this case operates at a very low voltage so that the width of its output pulse coincides almost exactly with the width of the positive half-wave of the sine curve coming from the transmitter 7 through the amplifier 17.

The rectzngular signal is delivered from the trigger 19 into the integrating circuit formed by the resistor 21 and the capacitor 22; the output voltage of this circuit opens the trigger 20 whose operating threshold is selected so that it opens when the signal of the transmitter 7 reaches its maximum value regardless of its absolute value.

From the triggers 18 and 20 the signals reach the signal-comparison circuit 23 which opens only when signals are present at the outputs of both triggers 18 and 20, thus giving a command at the same position of the vibration phase of the rotor 9 corresponding to the moment when the "light" point on the surface of the rotor 9 passes in front of the nozzle 2 of the chamber 1.

To eliminate the influence on the balancing accuracy of the forced rotor vibrations caused by the impacts of the amounts of the balancing compound applied to the rotor, the balancing compound is discharged from the nozzle 2 of the chamber 1 on the surface of the rotor 9 once in a certain number of its revolutions. Therefore the pulse signals are sent from the comparison unit 23 to the counter 24 whose output produces one pulse after receiving a preset number of pulses at the counter input.

The pulse passes from the counter 24 through the amplifier 25 to the thyristor 14 which opens and passes the charge from the capacitor 16 through the shaping resistor 15 to the electrodes 4a and 4b; the discharge occurring in the gap between the electrodes produces an electrohydraulic impact in the balancing compound. Under the effect of this impact a small amount of the balancing compound is discharged through the nozzle 2 from the chamber 1 onto the surface of the revolving rotor 9 exactly at the moment when its "light" point passes before the axis of the nozzle 2. Each discharged portion or amount of the liquid balancing compound becomes quickly solidified, thus reducing the unbalance of the rotor 9.

At the end of the discharge of the capacitor 16 the thyristor 14 closes. The pulse opening the thyristor 14 is sent concurrently with the pulse directed through the amplifier 25 and the delay circuit 26 to the control electrode of the thyristor 13. The delay unit 26 opens the thyristor 13 and starts charging the capacitor 16 only on completion of the processes in the discharge circuit of the pulse generator 5.

The process of discharging the portions of liquid balancing compound on the rotor 9 is repeated in cycles until the unbalance of said rotor is reduced below the permissible level. In this case the signal delivered from the transmitter 7 through the amplifier 17 to the trigger 18 will become lower than the operating voltage of the latter so that the trigger 18 will stay closed, the opening signal to the thyristor 14 will be discontinued and the process of balancing the rotor 9 is completed.

The inventive device for balancing rotors, based on the utilization of the energy of the electrohydraulic impact for the discharge of portions or amounts of the liquid balancing compound render it possible to control the mass of the discharged liquid and to raise considerably the frequency of the discharges. Besides, the mass of these portions can be controlled to suit the unbalance of the rotor, which ensures a high efficiency and accuracy of the balancing.

This also widens the range of the materials used as balancing compounds since the governing factor in each particular case is the possibility of keeping this material in a liquid state, the adhesion of this material to the surface of the rotor and the speed of its solidification. The device according to the invention can be used with such balancing materials as, for example, molten metals, resins, glues, plastics, etc.

What is claimed is:

1. A device for balancing rotors and to locate any unbalance therein, comprising a housing; a closed cylindrical chamber in said housing, provided with a removable nozzle and serving as a reservoir for a balancing compound in a liquid state; supports in which the rotor being balanced is rotated in front of said nozzle; means for rotating the rotor in said supports; a transmitter registering vibration parameters of said supports; two electrodes installed one opposite the other in said chamber and forming a discharge gap; a pulse generator having a charging circuit connected to said electrodes to deliver electric pulses thereto; said electrodes comprising electrohydraulic impact means in said chamber, energizable by said pulse generator; a control unit for said pulse generator, the output of said control unit being connected to said pulse generator while its input is connected to said transmitter which, at the moments when a "light" point on the surface of the rotor passes in front of said nozzle, sends signals to said control unit and, on receiving these signals, said control unit sends corresponding signals to said pulse generator, to energize said impact means; the impacts being imparted to the balancing compound in said chamber, for discharging small amounts thereof through said nozzle onto the "light" point of the rotor by direct spraying action through said nozzle when said impact means is energized; wherein said pulse generator has two switching devices including thyristors, one of which is in said charging circuit and the other in a discharge circuit of said pulse generator, while said control unit includes a threshold device in the form of at least one Schmitt trigger which, in case the unbalance of the rotor exceeds a permissible level, sends signals to said thyristors, said control unit being provided with a signal-delay circuit in a control circuit of a first thyristor, and having a time constant which is larger than the discharge time of said discharge circuit.

2. The balancing device as defined in claim 1, wherein said control unit includes a parallel first Schmitt trigger, and series-connected second and third Schmitt triggers, with an integrating circuit between them, and further comprising a circuit for comparing the signals received from said first and said third Schmitt triggers, the output of said integrating circuit being connected to a pulse counter including Schmitt triggers and being connected to control circuits of said first and said second thyristors.

3. The balancing device as defined in claim 2, further comprising means for providing a constant phase for the discharge of balancing compound, regardless of the degree of unbalance of the rotor being balanced, said means being connected in parallel with said at least one Schmitt trigger of the control unit; while the input of said comparing circuit is connected to the output of the afore-said Schmitt trigger and to the outputs of said second and third Schmitt triggers; wherein said means for providing a constant phase provides the discharge of the balancing compound once during at least one revolution of the rotor; whereas the input of said pulse counter is connected to the output of said comparing circuit, and it is the output of said pulse counter which is connected to said control circuits of the first and said second thyristors.

4. The balancing device as defined in claim 1, wherein said chamber accommodates a movable partition dividing the same into two isolated spaces, said electrodes and said nozzle being located in different spaces, said space with the electrodes being filled with a neutral liquid in which the electrohydraulic impacts are produced, whereas said space with the nozzle contains the balancing compound of which the small amounts are discharged at the moments of the impacts in the adjacent space through said nozzle by the action of said partition which transmits the impacts, and which constitutes a part of said means for applying the balancing compound directly to any surface point of the rotor being balanced.

5. A device for balancing rotors and to locate any unbalance therein, comprising a housing; a closed cylindrical chamber in said housing, provided with a removable nozzle and serving as a reservoir for a balancing compound in a liquid state; supports in which the rotor being balanced is rotated in front of said nozzle; means for rotating the rotor in said supports; a transmitter registering vibration parameters of said supports; two electrodes installed one opposite the other in said chamber and forming a discharge gap; a pulse generator having a charging circuit connected to said electrodes to deliver electric pulses thereto; said electrodes comprising electrohydraulic impact means in said chamber, energizable by said pulse generator; a control unit for said pulse generator, the output of said control unit being connected to said pulse generator while its input is connected to said tran smitter which, at the moments when a "light" point on the surface of the rotor passes in front of said nozzle, sends signals to said control unit and, on receiving these signals, said control unit sends corresponding signals to said pulse generator, to energize said impact means; the impacts being imparted to the balancing compound in said chamber, for discharging small amounts thereof through said nozzle onto the "light" point of the rotor by direct spraying action through said nozzle when said impact means is energized; wherein said chamber accommodates a movable partition dividing the same into two isolated spaces, said electrodes and said nozzle being located in different spaces, said space with the electrodes being filled with a neutral liquid in which the electrohydraulic impacts are produced, whereas said space with the nozzle contains the balancing compound of which the small amounts are discharged at the moments of the impacts in the adjacent space through said nozzle by the action of said partition which transmits the impacts and wherein said partition is made in the form of a flexible membrane.

6. A device for balancing rotors and to locate any unbalance therein, comprising a housing; a closed cylindrical chamber in said housing, provided with a removable nozzle and serving as a reservoir for a balancing compound in a liquid state; supports in which the rotor being balanced is rotated in front of said nozzle; means for rotating the rotor in said supports; a transmitter registering vibration parameters of said supports; two electrodes installed one opposite the other in said chamber and forming a discharge gap; a pulse generator having a charging circuit connected to said electrodes to deliver electric pulses thereto; and electrodes comprising electrohydraulic impact means in said chamber, energizable by said pulse generator; a control unit for said pulse generator, the output of said control unit being connected to said pulse generator while its input is connected to said transmitter which, at the moments when a "light" point on the surface of the rotor passes in front of said nozzle, sends signals to said control unit and, on receiving these signals, said control unit sends corresponding signals to said pulse generator, to energize said impact means; the impacts being imparted to the balancing compound in said chamber, for discharging small amounts thereof through said nozzle onto the "light" point of the rotor by direct spraying action through said nozzle when said impact means is energized; wherein said chamber accommodates a movable partition dividing the same into two isolated spaces, said electrodes and said nozzle being located in different spaces, said space with the electrodes being filled with a neutral liquid in which the electrohydraulic impacts are produced, whereas said space with the nozzle contains the balancing compound of which the small amounts are discharged at the moments of the impacts in the adjacent space through said nozzle by the action of said partition which transmits the impacts, and wherein said partition is made in the form of a piston.

7. The balancing device as defined in claim 6, wherein said piston has two stepped portions located in the corresponding ones of said spaces, the smaller one of said stepped portions being directed towards said nozzle.

* * * * *